United States Patent
Lee et al.

(10) Patent No.: US 7,420,541 B2
(45) Date of Patent: Sep. 2, 2008

(54) WIRELESS MOUSE

(75) Inventors: Chien-Hsin Lee, Lujhou (TW); Ming-Tse Tsai, Douliou (TW)

(73) Assignee: Darfon Electronics Corp., Taoyuan (TW)

( * ) Notice: Subject to any disclaimer, the term of this patent is extended or adjusted under 35 U.S.C. 154(b) by 638 days.

(21) Appl. No.: 11/081,438

(22) Filed: Mar. 16, 2005

(65) Prior Publication Data

US 2005/0206618 A1 Sep. 22, 2005

(30) Foreign Application Priority Data

Mar. 18, 2004 (TW) .............................. 93107358 A
Jun. 23, 2004 (TW) .............................. 93118184 A (51) Int. Cl.
 *G09G 5/06* (2006.01)
(52) U.S. Cl. ...................................... 345/163; 345/169
(58) Field of Classification Search ......... 345/156–173; 713/323

See application file for complete search history.

(56) References Cited

U.S. PATENT DOCUMENTS

| | | | | |
|---|---|---|---|---|
| 5,990,868 A | * | 11/1999 | Frederick | 345/158 |
| 2003/0197683 A1 | | 10/2003 | Huang et al. | 345/163 |
| 2005/0206613 A1 | * | 9/2005 | Chan et al. | 345/156 |

FOREIGN PATENT DOCUMENTS

| | | | |
|---|---|---|---|
| JP | 09016303 A | * | 1/1997 |
| TW | 577012 | | 2/2004 |

* cited by examiner

*Primary Examiner*—Nitin Patel
(74) *Attorney, Agent, or Firm*—Thomas, Kayden, Horstemeyer & Risley (57) ABSTRACT

A wireless mouse comprising an operating interface, a wireless communication module and a control unit is provided. The wireless communication module is for communicating with a receiver electrically coupled to a computer. When the operating interface is continuously pressed for a first particular period of time, the control unit controls the wireless mouse to enter a power-saving mode. When the operating interface is continuously pressed for a second particular period of time, the control unit recognizes the identity of the wireless mouse via the wireless communication module and the receiver.

15 Claims, 7 Drawing Sheets

WIRELESS MOUSE

This application claims the benefits of Taiwan applications, Serial No. 93107358, filed Mar. 18, 2004 and Serial No. 93118184, filed Jun. 23, 2004, the subject matter of which is incorporated herein by reference.

BACKGROUND OF THE INVENTION

1. Field of the Invention

The invention relates in general to a wireless mouse, and more particularly to a wireless mouse entering a power-saving mode or performing identity recognition when an operating interface is continuously pressed for a particular period of time.

2. Description of the Related Art

Figure 1:
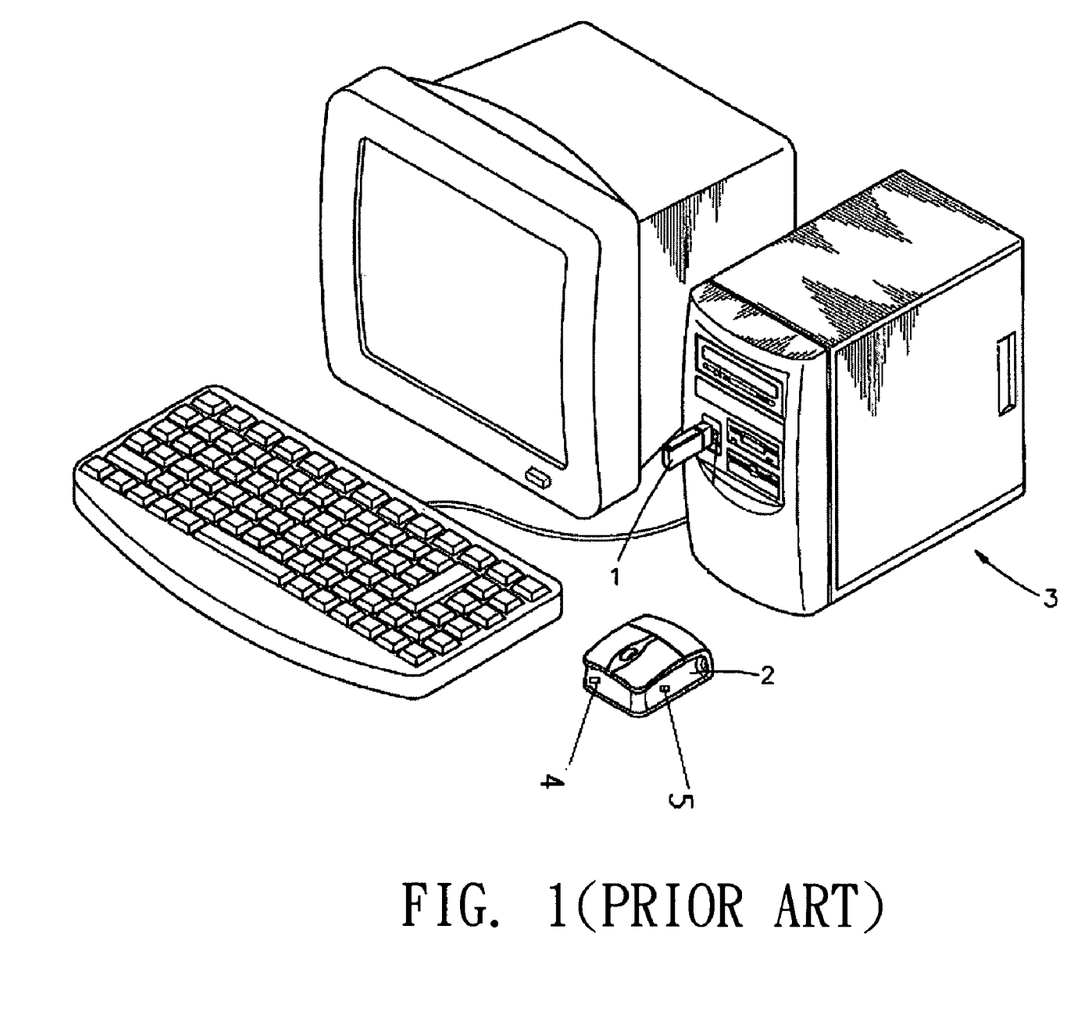
FIG. 1 (Prior Art) is a diagram of a conventional wireless input device.

Referring to FIG. 1, it is a diagram of a conventional wireless input device. In FIG. 1, a wireless input device comprises a computer 3, a receiver 1 and a wireless mouse 2. The receiver 1 is linked to a computer interface such as a USB. The cursor signal or click signal detected by the wireless mouse 2 is transmitted to the computer 3 via the receiver 1. Currently, the wireless mouse is gaining an increasing popularity in the market. However, the wireless mouse is very power-consuming, incurring an extra burden of battery purchase to the user. Therefore, how to tackle with the power-consuming problem of the wireless mouse has become an imminent issue to be resolved. The prior arts achieve the object of power-saving by disposing an additional switch 4 on the bottom or lateral side of the wireless mouse. The switch 4 is used to switch off the power of the wireless mouse 2 when the user is not using the wireless mouse for the time being. However, the above method causes inconvenience to the user and requires additional parts such as the switch 4 for instance.

As shown in FIG. 1, the wireless mouse according to prior art uses an extra button 5 to perform a link ID process between the wireless mouse 2 and the receiver 1. The link ID process enables the wireless mouse 2 and the receiver 1 to generate a wireless link and recognition according to an identification code (ID) so as to resolve the interference problem arising when various wireless mice share the same frequency. However, the above method causes inconvenience to the user and requires additional parts such as the button 5 for instance.

SUMMARY OF THE INVENTION

It is therefore an object of the invention to provide a wireless mouse for the user to conveniently operate and enable a wireless mouse to enter a power-saving mode. The invention provides a wireless mouse, enabling the user to conveniently perform a link ID process between the wireless mouse and a receiver.

According to an object of the invention, a wireless mouse comprising an operating interface and a control unit is provided. When the operating interface is continuously pressed for a particular period of time, the control unit controls the wireless mouse to enter a power-saving mode.

According to another object of the invention, a wireless mouse comprising a wireless communication module, an operating interface and a control unit is provided. The wireless communication module is for communicating with a receiver electrically coupled to a computer. When the operating interface is continuously pressed for a particular period of time, the control unit recognizes the identity of the wireless mouse via the wireless communication module and the receiver.

According to yet another object of the invention, a power-saving method of a wireless mouse is provided. The wireless mouse comprises an operating interface. According to the method, firstly, the operating interface is continuously pressing for a particular period of time. Then, the wireless mouse is controlled to enter a power-saving mode.

According to yet another object of the invention, a method for activating wireless mouse identity recognition is provided. The wireless mouse comprises an operating interface and a wireless communication module for communicating with a receiver electrically coupled to a computer. According to the method, firstly, the operating interface is continuously pressed for a particular period of time. Then, the identity of the wireless mouse is recognized via the wireless communication module and the receiver.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 2A:
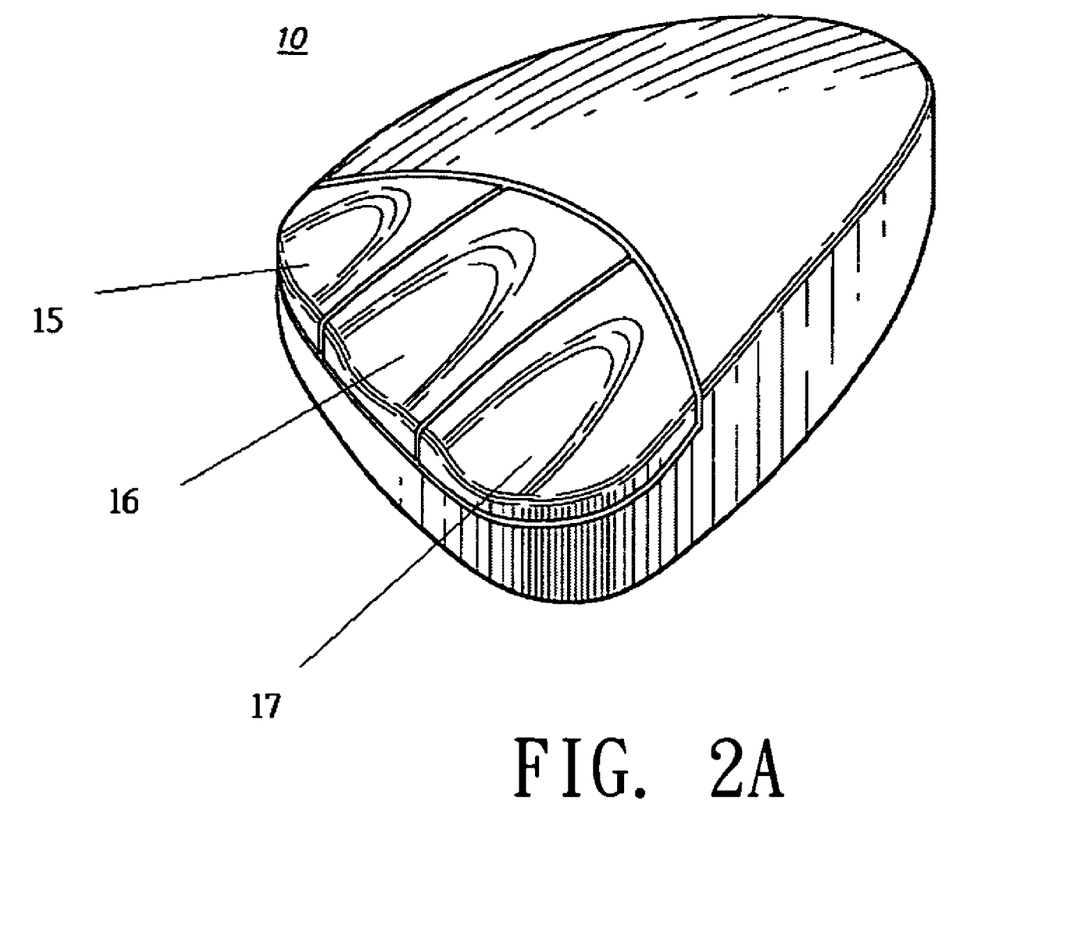
FIG. 2A is a diagram of a wireless mouse according to a first embodiment of the invention.
Figure 2B:
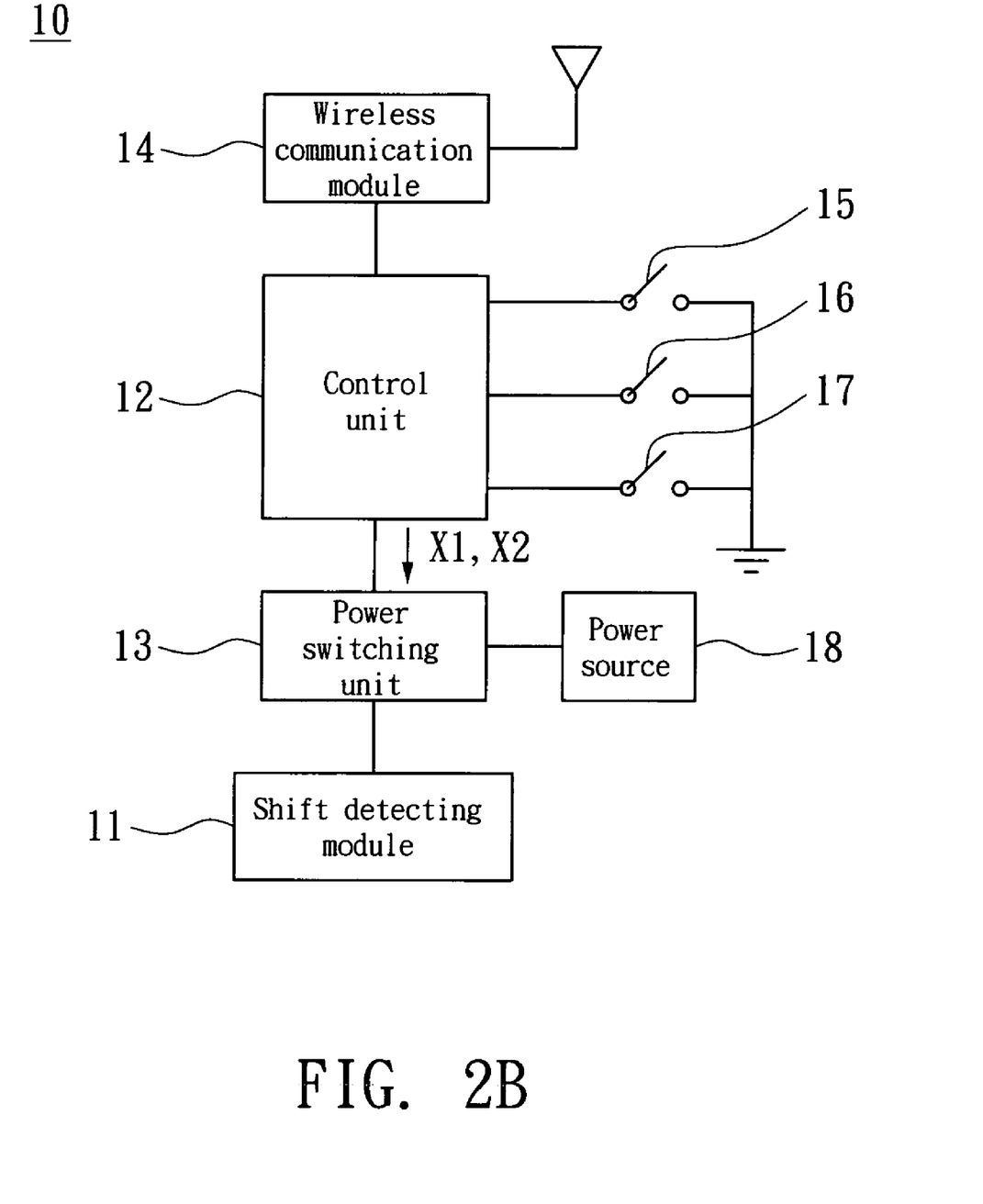
FIG. 2B is a block diagram of a wireless mouse according to the first embodiment of the invention.

Referring to FIGS. 2A~2B, FIG. 2A is a diagram of a wireless mouse according to a first embodiment of the invention, FIG. 2B is a block diagram of a wireless mouse according to the first embodiment of the invention. The present embodiment provides a wireless mouse 10 comprising a shift detecting module 11, a control unit 12, a power switching unit 13 electrically coupled to a power source 18, a wireless communication module 14 for communicating with a receiver (unshown) electrically coupled to a computer (unshown), and an operating interface. The operating interface of the embodiment is exemplified by a first button 15, a second button 16 and a third button 17. The shift detecting module 11 is for sensing a shift signal (unshown) of the wireless mouse 10 when the wireless mouse is moved on a working plane. The control unit 12 is electrically coupled to the first button 15, the second button 16, the third button 17, the wireless communicating unit 14 and the power switching unit 13. The control unit is for controlling the power switching unit 13. The wireless communication module 14 is for transmitting the shift signal to the receiver which is electrically coupled to the computer. So that, a cursor on a screen of a monitor (unshown) electrically coupled the computer can moved according to the shift signal. The first button 15, the second button 16, and the third button 17 are respectively electrically coupled to the control unit 12. In the present embodiment, the first button 15, the second button 16, and the third button 17 are incorporated in the click button of the wireless mouse 10, so there is no need to install any extra buttons on the wireless mouse 10. Besides, the second button 16 can be a roller-type button which can be rolled and pressed. The power switching unit 13 can selectively choose whether to provide power to the shift detecting module 11 or not. In the present embodiment, when at least one of the first button 15, the second button 16 and the third button 17 is continuously pressed time for a first particular period of time, the control unit 12 transmits a power-saving mode activating signal X1 to the power switching unit 13. The power switching unit 13 switches off the power of shift detecting module 11, so that the wireless mouse 10 enters a power-saving mode. When the wireless mouse 10 is at the power-saving mode, one of the first button 15, the second button 16, and the third button 17 is pressed for the control unit 12 to transmit a operating mode resuming signal X2 to the power switching unit 13, the power switching unit 13 resumes the power for the shift detecting module 11 for the wireless mouse 10 to enter the operating mode. When the wireless mouse 10 enters the operating mode, the user can operate the wireless mouse 10 normally.

Figure 3:
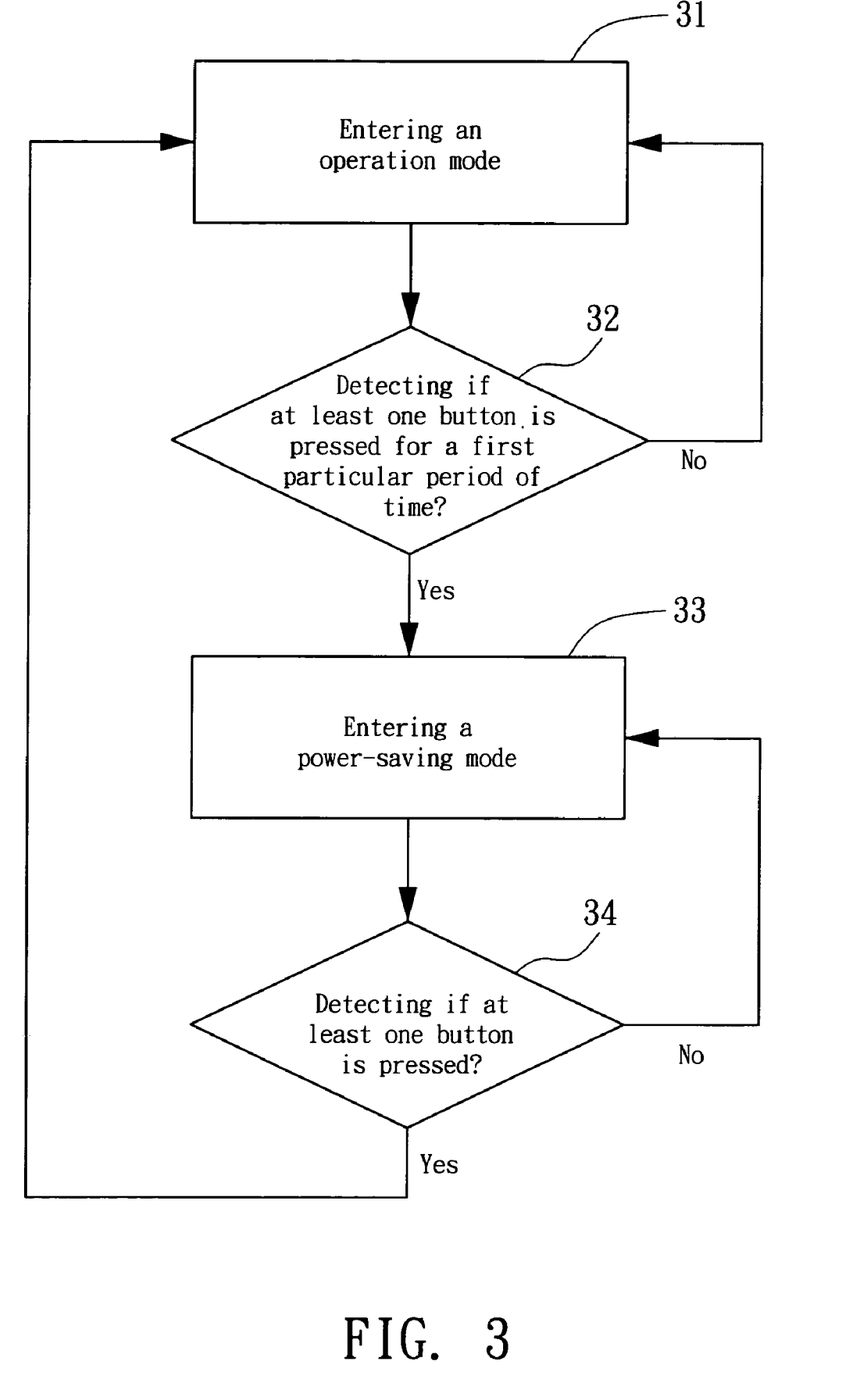
FIG. 3 is a flow chart of a power-saving method of a wireless mouse according to the first embodiment of the invention.

Referring to FIG. 3, it is a flow chart of a power-saving method of a wireless mouse according to the first embodiment of the invention. The invention provides a power-saving method of the wireless mouse 10. Please referring to FIGS. 2A~2B, the power-saving method comprises the following steps. Firstly, in step 31, the wireless mouse 10 is at the operating mode. Then, in step 32, the wireless mouse 10 continuously detects or determines if at least one of the first button 15, the second button 16, and the third button 17 is pressed for the first particular period of time. When one or more buttons are pressed at the same time for the first particular period of time, step 33 is proceeded. In step 33, the control unit 12 transmits the power-saving mode activating signal X1 to the power switching unit 13, so that the power switching unit 13 switches off the power of the shift detecting module 11. The wireless mouse 10 enters the power-saving mode. When the wireless mouse 10 is at the power-saving mode, the wireless mouse 10 detects or determines if at least one of the first button 15, the second button 16, and the third button 17 is pressed or if the shift detecting module 11 outputs another shift signal. When one or more buttons are pressed or the shift detecting module 11 outputs another shift signal, step 31 is proceeded. In step 31, the control unit 12 transmits an operating mode resuming signal X2 to the power switching unit 13, so that the power switching unit 13 resumes the power of the shift detecting module 11. The wireless mouse 10 enters the operating mode.

Moreover, in the present embodiment, the shift detecting module 11 can adopt an Agilent optical module, that is, an Optical 2030 type integrated circuit (IC). Since Optical 2030 type IC is very-power-consuming when the wireless mouse 10 is at the operating mode, the power consumption of the wireless mouse 10 would be reduced and the duration of the wireless mouse 10 would be extended if the power-saving method of the embodiment is adopted.

Second Embodiment

Figure 4:
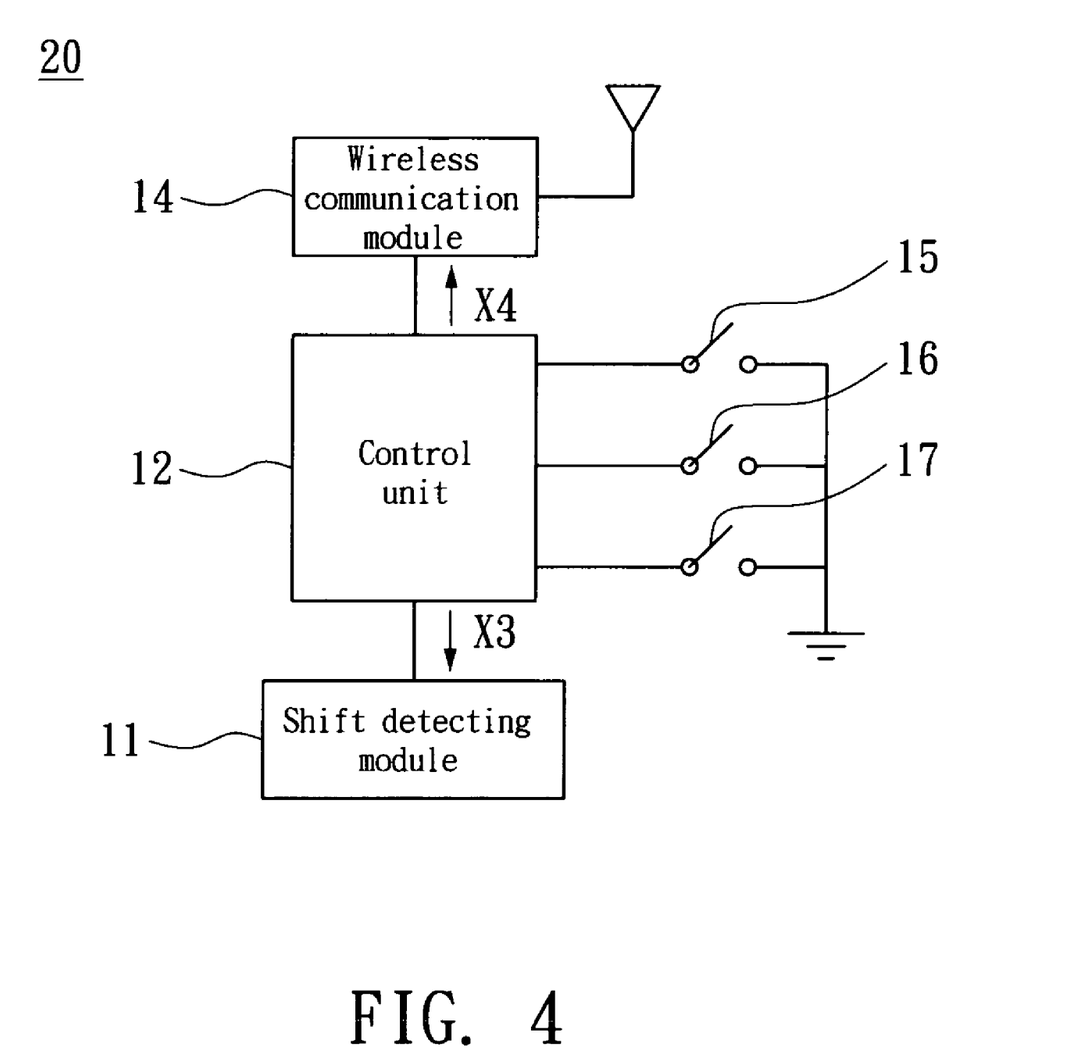
FIG. 4 is a block diagram of a wireless mouse according to a second embodiment of the invention.

Referring to FIG. 4, it is a block diagram of a wireless mouse according to a second embodiment of the invention. The difference between the wireless mouse 20 of the present embodiment and the wireless mouse 10 of the first embodiment is that the wireless mouse 20 is lack of the power switching unit 13 and the power source 18. Most components of the wireless mouse 20 of the present embodiment are similar to those of the wireless mouse 10 of the first embodiment, so that the numbering used in most components are kept the same. The wireless mouse 20 utilizes a dormant mode activating function of the shift detecting module 11 to switch the dormant mode of the wireless mouse 20, so that the power-saving efficacy can be achieved. When at least one of the first button 15, the second button 16, and the third button 17 are continuously pressed for a second particular period of time, the control unit 12 transmits a first dormant mode activating signal X3 to the shift detecting module 11 for enabling the shift detecting module 11 to enter a first dormant mode. The second particular period of time is different from the first particular period of time in the first embodiment.

Moreover, the in-built dormant mode function of the wireless communication module 14 can be used. When at least one of the first button 15, the second button 16, and the third button 17 are continuously pressed for a particular third period of time, the control unit 12 transmits a second dormant mode activating signal X4 to the wireless communication module 14 for the wireless communication module 14 to enter a second dormant mode. The third particular period of time is different from the first particular period of time in the first embodiment and the second particular period of time. According to the above methods, the user can enable the wireless mouse 20 to enter the power-saving mode more conveniently.

Third Embodiment

Figure 5:
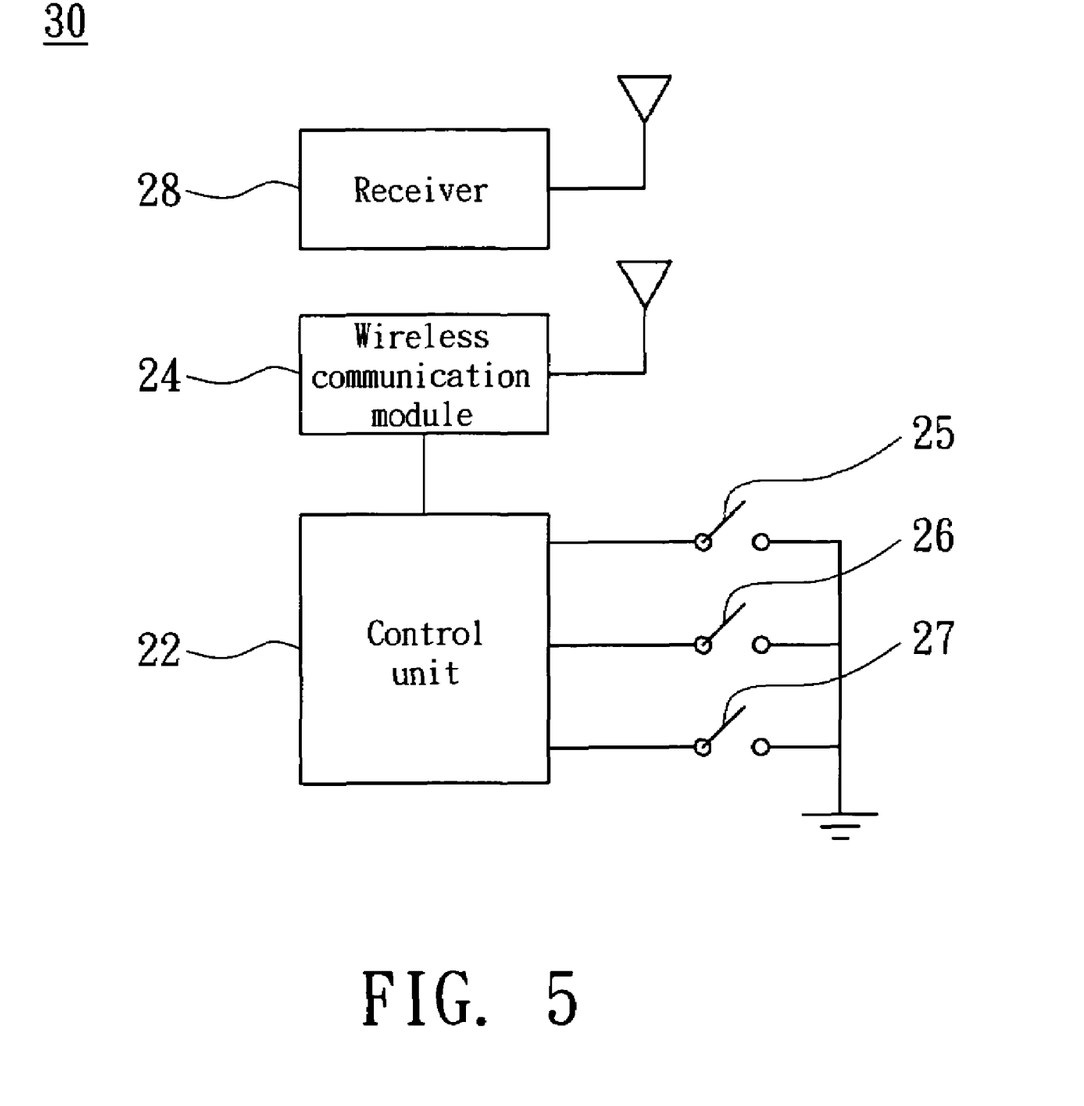
FIG. 5 is a block diagram of a wireless mouse according to a third embodiment of the invention.

Referring to FIG. 5, it is a block diagram of a wireless mouse according to a third embodiment of the invention is shown. In FIG. 5, the wireless mouse 30 includes a control unit 22, a wireless communication module 24 electrically coupled to the control unit 22, and a first button 25, a second button 26, and a third button 27 respectively electrically coupled to the control unit 22. The wireless communication module 24 is for communicating with a receiver 28 electrically coupled a computer (unshown). When at least one of the first button 25, the second button 26, and the third button 27 are continuously pressed for a fourth particular period of time, the control unit 22 perform a link ID process via the wireless communication module 24 and the receiver 28. In other words, the control unit 22 recognizes the identity of the wireless mouse 30 via the wireless communication module 24 and the receiver 28. The fourth particular period of time is different from the first particular period of time in the first embodiment, the second particular period of time and the third particular period of time in the second embodiment.

Figure 6:
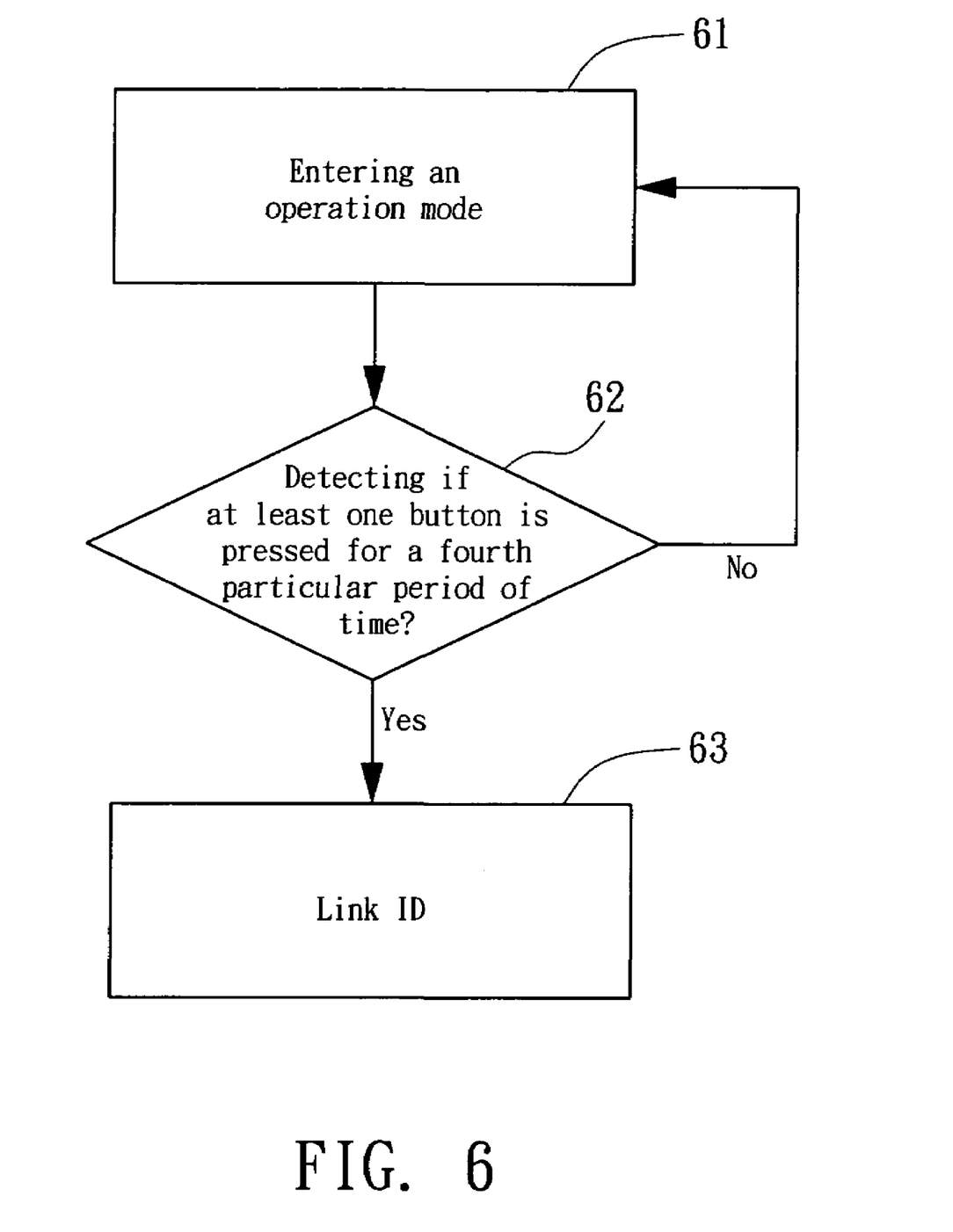
FIG. 6 is a flow chart of a link ID activating method of a wireless mouse according the third embodiment of the invention.

Referring to FIG. 6, it is a flow chart of a link ID activating method of a wires mouse according the third embodiment of the invention. The invention provides a link ID activating method for a wireless mouse 30 and a receiver 28. The activating method comprises several steps. Firstly, in step 61, the wireless mouse 30 is at the operating mode. Then, in step 62, the wireless mouse 30 continuously detects or determines if at least one of the first button 25, the second button 26 and the third button 27 is continuously pressed for the fourth particular period of time. When one or more buttons are continuously pressed at the same time for the fourth particular period of time, step 63 is proceeded. A link ID is performed between the control unit 22 and the receiver 28 via the wireless communication module 24. In other words, when one or more buttons are continuously pressed at the same time for the fourth particular period of time, the control unit 22 recognizes the identity of the wireless mouse 30 via the wireless communication module 24 and the receiver 28.

The wireless mouse disclosed in the above embodiments of the invention provides a convenient method for the user to operate and enable the wireless mouse to enter a power-saving mode. The invention further provides a wireless mouse enabling the user to conveniently perform a link ID process between the wireless mouse and a receiver.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless mouse, comprising:
    an operating interface;
    a control unit electrically coupled to the operating interface, wherein when the operating interface is continuously pressed for a first particular period of time, the control unit controls the wireless mouse to enter a power-saving mode; and
    a wireless communication module electrically coupled to the control unit, wherein the wireless communication module is for communicating with a receiver electrically coupled to a computer, and wherein when the operating interface is continuously pressed for a second particular period of time, the control unit recognizes the identity of the wireless mouse via the wireless communication module and the receiver.

2. The wireless mouse according to claim 1, wherein the operating interface includes three buttons, wherein when the three buttons are continuously pressed at the same time for the first particular period of time, the control unit controls the wireless mouse to enter the power-saving mode.

3. The wireless mouse according to claim 1, the operating interface including three buttons, wherein when any two of the three buttons are continuously pressed at the same time for the first particular period of time, the control unit controls the wireless mouse to enter the power-saving mode.

4. The wireless mouse according to claim 1, the operating interface including three buttons, wherein when any one of the three buttons is continuously pressed for the first particular period of time, the control unit controls the wireless mouse to enter the power-saving mode.

5. The wireless mouse according to claim 1, the operating interface including three buttons, wherein when the three buttons are continuously pressed at the same time for the second particular period of time, the control unit recognizes the identity of the wireless mouse via the wireless communication module and the receiver.

6. The wireless mouse according to claim 1, the operating interface including three buttons, wherein when any two of the three buttons are continuously pressed at the same time for the second particular period of time, the control unit recognizes the identity of the wireless mouse via the wireless communication module and the receiver.

7. The wireless mouse according to claim 1, the operating interface including three buttons, wherein when any one of the three buttons is continuously pressed for the second particular period of time, the control unit recognizes the identity of the wireless mouse via the wireless communication module and the receiver.

8. The wireless mouse according to claim 1, wherein the first particular period of time is longer than the second particular period of time.

9. The wireless mouse according to claim 1, wherein the first particular period of time is shorter than the second particular period of time.

10. A wireless mouse, comprising:
    an operating interface;
    a control unit electrically coupled to the operating interface, wherein when the operating interface is continuously pressed for a first particular period of time, the control unit controls the wireless mouse to enter a power-saving mode; and
    a shift detecting module for sensing a shift signal of the wireless mouse; and
    a power switching unit electrically coupled to the control unit, a power source and the shift detecting module, wherein when the operating interface is continuously pressed for the first particular period of time, the control unit controls the power switching unit to switch off the power of the shift detecting module, so that the wireless mouse enters the power-saving mode.

11. A power-saving method of a wireless mouse, the wireless mouse including an operating interface and a wireless communication module for communicating with a receiver coupled to a computer, the method comprising:
    continuously pressing the operating interface for a first particular period of time; and
    controlling the wireless mouse to enter a power-saving mode, wherein
    continuously pressing the operating interface for a second particular period of time by continuously pressing any one of the three buttons for the second particular period of time; and
    recognizing the identity of the wireless mouse via the wireless communication module and the receiver.

12. The method according to claim 11, wherein the first particular period of time is longer than the second particular period of time.

13. The method according to claim 11, wherein the first particular period of time is shorter than the second particular period of time.

14. The method according to claim 11, the operating interface including three buttons, wherein the step of continuously pressing the operating interface for the second particular period of time further comprises:
    continuously pressing the three buttons at the same time for the second particular period of time.

15. The method according to claim 11, the operating interface including three buttons, wherein the step of continuously pressing the operating interface for the second particular period of time further comprises:
    continuously pressing any two of the three buttons at the same time for the second particular period of time.

* * * * *